US009788368B2

(12) United States Patent
Fattorini et al.

(10) Patent No.: US 9,788,368 B2
(45) Date of Patent: Oct. 10, 2017

(54) INDUCTION HEATING GENERATOR AND AN INDUCTION COOKING HOB

(71) Applicant: Electrolux Home Products Corporation N. V., Brussels (BE)

(72) Inventors: Andrea Fattorini, Forli (IT); Svend Erik Christiansen, Forli (IT); Laurent Jeanneteau, Forli (IT); Alex Viroli, Forli (IT)

(73) Assignee: Electrolux Home Products Corporation NV, Brussels (BE)

( * ) Notice: Subject to any disclaimer, the term of this patent is extended or adjusted under 35 U.S.C. 154(b) by 266 days.

(21) Appl. No.: 14/417,420

(22) PCT Filed: Jul. 29, 2013

(86) PCT No.: PCT/EP2013/065902

§ 371 (c)(1),
(2) Date: Jan. 26, 2015

(87) PCT Pub. No.: WO2014/032881

PCT Pub. Date: Mar. 6, 2014

(65) Prior Publication Data

US 2015/0208467 A1 Jul. 23, 2015

(30) Foreign Application Priority Data

Aug. 28, 2012 (EP) .................................... 12181929

(51) Int. Cl.

| | |
|---|---|
| ***H05B 6/06*** | (2006.01) |
| ***H05B 6/04*** | (2006.01) |
| ***H02M 7/53*** | (2006.01) |

(52) U.S. Cl.
CPC .................................. *H05B 6/062* (2013.01)

(58) Field of Classification Search
CPC ..................................................... H05B 6/062
(Continued)

(56) References Cited

U.S. PATENT DOCUMENTS 4,935,672 A 6/1990 Lammers et al.
6,064,584 A 5/2000 Cornec et al.
(Continued)

FOREIGN PATENT DOCUMENTS

CN 1438830 A 8/2003
EP 2360989 8/2011
(Continued)

OTHER PUBLICATIONS

Translation of Hirate Yoshitoshi et al. (JP2009123492A), Induction cooker, Jun. 4, 2009, EPO and Google.*
(Continued)

*Primary Examiner* — Quang Van
(74) *Attorney, Agent, or Firm* — Pearne & Gordon LLP

(57) ABSTRACT

An induction heating generator includes a rectifier circuit (10). Four capacitors (C1, C2, C3, C4) form a bridge circuit between two output terminals of the rectifier circuit (10). The bridge circuit includes a first capacitor series (C1, C2) and a second capacitor series (C3, C4). An induction coil (L) is interconnected in the center of the bridge circuit. At least two semiconductor switches (S1, S2) are connected in each case parallel to one of the capacitors (C1, C2) of the first capacitor series (C1, C2). The induction heating generator includes a control circuit block (14, 16, 18, 20, 22) for controlling the control electrodes of the semiconductor switches (S1, S2). A shunt element (SE) is connected in series with the first capacitor series (C1, C2).

13 Claims, 11 Drawing Sheets

(58) Field of Classification Search
USPC ............... 219/620, 625, 626, 661, 662, 665; 363/95, 16, 17, 98, 41, 45, 131, 132; 315/200 R, 226, DIG. 7
See application file for complete search history.

(56) References Cited

U.S. PATENT DOCUMENTS

| | | | | |
|---|---|---|---|---|
| 2003/0151378 | A1 | 8/2003 | Busse et al. | |
| 2009/0212643 | A1* | 8/2009 | Skliutas ................ | H02J 3/1821 307/130 |
| 2012/0018426 | A1 | 1/2012 | Brosnan et al. | |

FOREIGN PATENT DOCUMENTS

| | | | |
|---|---|---|---|
| JP | 2004-048945 | A | 2/2004 |
| JP | 2009123492 | | 6/2009 |

OTHER PUBLICATIONS

International Search Report for PCT/EP2013/065902, dated Oct. 14, 2013, 2 pages.

* cited by examiner

INDUCTION HEATING GENERATOR AND AN INDUCTION COOKING HOB

The present invention relates to an induction heating generator according to the preamble of claim 1. Further, the present invention relates to an induction cooking hob comprising at least one induction heating generator.

An induction heating generator is used in an induction cooking heater. FIG. 10 illustrates a zero volt switching (ZVS) half bridge induction heating generator with a control circuit block according to the prior art. Said half bridge induction heating generator comprises two transistors S1 and S2, two diodes D1 and D2, an induction coil L and four capacitors C1, C2, C3 and C4. A rectifier circuit 10 includes four diodes and a further capacitor. The rectifier circuit 10 is provided for the connection to an AC power terminal 12. Further, the induction heating generator comprises the gate drive circuit 14, the microcontroller 16, the power control circuit 18, the zero cross detector 20 and a high frequency current transformer 40. A diagram of an induction coil current IL, an inverter output voltage VS and gate voltages VG1 and VG2 are shown in FIG. 11.

However, the induction heating generator is not realized on a single printed circuit board. Some integrated circuits are standalone circuits. A compact arrangement of the induction heating generator is not possible.

It is an object of the present invention to provide an improved induction heating generator, which allows a compact arrangement of its components.

The object of the present invention is achieved by the induction heating generator according to claim 1.

According to the present invention a shunt element is connected in series with the first capacitor series, wherein said shunt element and the first capacitor series are interconnected between the output terminals of the rectifier circuit, and wherein the shunt element is connected to an input of the control circuit block.

The main idea of the present invention is the shunt element connected in series with the first capacitor series. Thus, the shunt element is also connected in series with the semiconductor switches. Since the shunt element is connected to the input of the control circuit block, several parameters can be detected or estimated, respectively, by the control circuit block.

In particular, the induction heating generator is a half bridge induction heating generator.

Preferably, at least two diodes are connected in each case parallel to one of the semiconductor switches.

Further, the control circuit block may comprise a detection circuit for detecting a voltage drop of the shunt element.

Moreover, the control circuit block may comprise a microcontroller and an analogue digital converter.

Preferably, the components of the induction heating generator are arranged on one single printed circuit board. Said single printed circuit board contributes to the compact arrangement of the induction heating generator.

In particular, the components of the induction heating generator are surface mounted devices (SMD).

According to the preferred embodiment of the present invention the shunt element has a resistance between 0.01Ω and 0.1Ω, in particular 0.05Ω. This low resistance does not disturb the operations of the induction heating generator.

Preferably, the control circuit block is provided for estimating a phase angle delay between switching one semiconductor switch and the subsequent zero crossing of an induction coil current.

For example, the control circuit block is provided for estimating the presence of a pot above the induction coil on the basis of the phase angle delay.

Further, the control circuit block may be provided for estimating a dissipated power in the pot above the induction coil on the basis of the phase angle delay.

In particular, the phase angle delay is estimated on the basis of an intersection line of the induction coil current with a zero value.

For example, the intersection line is estimated on the basis of at least two sample points of the induction coil current.

Preferably, the semiconductor switches are transistors, in particular insulated gate bipolar transistors.

At last the present invention relates to an induction cooking hob including at least one induction heating generator mentioned above.

Novel and inventive features of the present invention are set forth in the appended claims.

The present invention will be described in further detail with reference to the drawings, in which FIG. 1 illustrates a circuit diagram of a half bridge induction heating generator with a control circuit block according to a preferred embodiment of the present invention, FIG. 2 illustrates a diagram of an induction coil current, an inverter output voltage, gate voltages and a shunt current of the induction heating generator according to the preferred embodiment of the present invention, FIG. 3 illustrates diagrams of a shunt current of the induction heating generator according to the preferred embodiment of the present invention, FIG. 4 illustrates a detailed circuit diagram of a detection circuit of the half bridge induction heating generator according to a preferred embodiment of the present invention, FIG. 5 illustrates a diagram of an induction coil current and the shunt voltage of the induction heating generator according to the preferred embodiment of the present invention, FIG. 6 illustrates a diagram of an induction coil current and the shunt voltage of the induction heating generator according to the preferred embodiment of the present invention, FIG. 7 illustrates a diagram of an induction coil current and the shunt voltage of the induction heating generator according to the preferred embodiment of the present invention, FIG. 8 illustrates a diagram of an induction coil current and the shunt voltage of the induction heating generator according to the preferred embodiment of the present invention, FIG. 9 illustrates a diagram of an induction coil current and the shunt voltage of the induction heating generator according to the preferred embodiment of the present invention, FIG. 10 illustrates a circuit diagram of a half bridge induction heating generator according to the prior art, and FIG. 11 illustrates a diagram of the induction coil current, the inverter output voltage and the gate voltages of the induction heating generator according to the prior art.

FIG. 1 illustrates a circuit diagram of a half bridge induction heating generator with a control circuit block according to a preferred embodiment of the present invention.

The half bridge induction heating generator comprises a rectifier circuit 10. The rectifier circuit 10 is connected to an AC power terminal 12. The proper half bridge induction heating generator comprises a first transistor S1, a second transistor S2, a first diode D1, a second diode D2, four capacitors C1, C2, C3, C4, an induction coil L and a shunt element SE. The control circuit block comprises a gate drive circuit 14, a microcontroller 16, a power control circuit 18, a zero cross detector 20 and a detection circuit 22. The transistors S1 and S2 may be MOSFETs, IGBTs, MCTs or SITs.

The first transistor S1 and the second transistor S2 are connected in series. The first diode D1 is connected in parallel to the first transistor S1. In the same way, the second diode D2 is connected in parallel to the second transistor S2. Further, the first capacitor C1 is connected in parallel to the first transistor S1. Accordingly, the second capacitor C2 is connected in parallel to the second transistor S2. In other words, the first transistor S1, the first diode D1 and the first capacitor C1 form a first group of parallel elements. In a similar way, the second transistor S2, the second diode D2 and the second capacitor C2 form a second group of parallel elements. The first group, the second group and the shunt element SE are connected in series.

Further, the series of the first group, the second group and the shunt element SE is connected in parallel to the series of the third capacitor C3 and the fourth capacitor C4. This parallel arrangement is connected to an output of the rectifier circuit 10.

Moreover, the connecting point between the first transistor S1 and the second transistor S2 is connected to the connecting point between the third capacitor C3 and the fourth capacitor C4. One terminal of the induction coil L is connected to the connecting point between the first transistor S1 and the second transistor S2. Another terminal of the induction coil L is connected to the connecting point between the third capacitor C3 and the fourth capacitor C4.

An input of the detection circuit 22 is connected to the connecting point of the second transistor S2 and the shunt element SE. An output of the detection circuit 22 is connected to the power control circuit 18. An output of the zero cross detector 20 is also connected to the power control circuit 18. An output of the power control circuit 18 is connected to an input of the microcontroller 16. An output of the microcontroller 16 is connected to an input of the gate drive circuit 14. Two outputs of the gate drive circuit 14 are connected to the control electrodes of the first transistor S1 and the second transistor S2, respectively.

The shunt element SE has a very low resistance, for example about 0.05 Ohm. Thus, the influence to the properties of the half bridge induction heating generator is relative small. The shunt element SE does not disturb the operations of the half bridge induction heating generator. In particular, the parameters phase angle delay, switch-off current and peak current may be detected at the shunt element SE by the detection circuit 22. The detected values are converted by the detection circuit 22 and/or the power control circuit 18 for the microcontroller 16.

FIG. 2 illustrates a diagram of an induction coil current IL, an inverter output voltage VS, a first gate voltage VG1, a second gate voltage VG2 and a shunt current IS of the induction heating generator according to the preferred embodiment of the present invention.

The induction coil current IL, the inverter output voltage VS, the first gate voltage VG1, the second gate voltage VG2 and the shunt current IS are synchronously shown as a function of the time t.

FIG. 3 illustrates diagrams of a shunt current IS of the induction heating generator according to the preferred embodiment of the present invention.

The first diagram shows the proper shunt current IS at the input of the detection circuit 22. The second diagram shows the shunt current IS with an offset voltage 34. The third diagram shows the shunt current IS with a phase angle delay 28.

FIG. 4 illustrates a detailed circuit diagram of the detection circuit 22 of the half bridge induction heating generator according to the preferred embodiment of the present invention. The detection circuit 22 comprises an operational amplifier 30, a diode 32, eight resistor elements R1 to R8 and two capacitors C.

The voltage across the shunt element SE is applied to the resistor element R1 and offset by the resistor elements R2 and R3, so that the input of the operational amplifier 30 receives positive values. Referring to the ground 34 the voltage across the shunt element 22 reflects a part of the induction coil current IL. The offset by the resistor elements R2 and R3 allows that only positive values are amplified by the operational amplifier 30 and read by an AD converter input of the microcontroller 16.

The output signals I1 and I2 of the detection circuit 22 are filtered and transferred to the AD converter input of the microcontroller 16. For example, the output signals I1 and I2 are used as parameters for the pot detection and power estimation. These parameters can be achieved by the value of the phase angle delay between the output of the induction heating generator and the zero crossing of the induction coil current IL. The phase angle delay can be derived by a combination of features of the AD converter in the microcontroller 16 and a software algorithm. The AD conversion can be triggered to start at a relative time of a cycle. If the relative time is given in degrees, then the complete cycle comprises 360 degrees.

For example, the sampling of the AD converter is triggered at 45°, 70°, 90°, 135° and 180°. The estimated parameters may be the switch-off current, the peak current and the phase angle delay. The switch-off current is the current at 180° cycle time. The biggest of the sampled values can be taken as the peak current.

The phase angle delay is the time delay between switching off one transistor S1 or S2 until the current in the induction coil L is zero. The phase angle delay can also be translated into a relative value in relation to the cycle time. Within a half-cycle the relative time is given by a value between 0° and 180°. It is assumed that each half-cycle is symmetric, so that the phase angle delay will always move in an interval below 90°. In practical applications the range of the phase angle delay is between 20° and 90°. When no power is dissipated in a load, then the phase angle delay will be close to 90°. Thus, the presence of a pot 24 or 26 can be detected by using the phase angle delay. Further, the phase angle delay can be used for estimating the dissipated power in the pot 24 or 26.

The phase angle delay is determined by calculating an intersection of the induction coil current IL at zero. The sample values are used. When the behaviour of the half bridge is known, then the right sample values can be chosen for this calculation. The calculation approximates an intersection by assuming a straight line between two sample points. The intersection at zero is calculated by a simple formula. The state of the half bridge is changing according to the load and/or pot 24 or 26 above the induction coil L. The state of the half bridge varies between the circulated current only without pot 24 or 26 on the one hand and states close to resonance on the other hand, and states between them. The right sample point has to be chosen in dependence of the state of the induction heating generator.

This part of the diagram should be used, where the current slope (dI/dt) is or can be assumed to be close to a straight line. In this case, the error is relative small.

Examples of generator states are shown in FIG. 5 to FIG. 9.

FIG. 5 illustrates a diagram of the induction coil current IL and the inverter output voltage VS of the induction heating generator according to the preferred embodiment of the present invention. The power is very high and the state is close to resonance. An intersection line 36 is shown. The sample points of the intersection line 36 are at 0° and 45°. The zero crossing is represented by reference number 38.

FIG. 6 illustrates a diagram of the induction coil current IL and the inverter output voltage VS of the induction heating generator according to the preferred embodiment of the present invention. In this state no pot is above the induction coil L. The zero crossing is represented by reference number 38.

Figure 1:
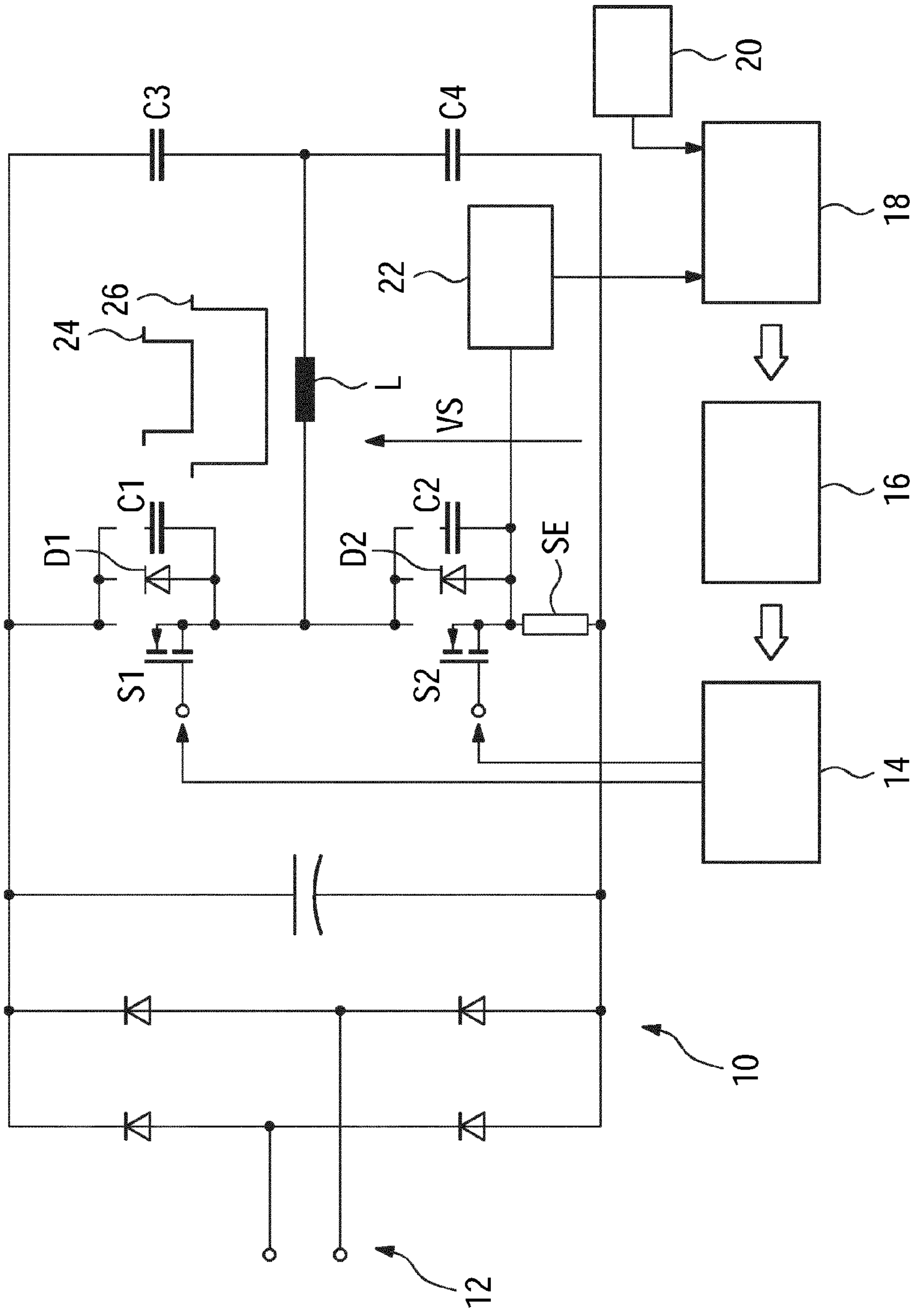
Figure 2:
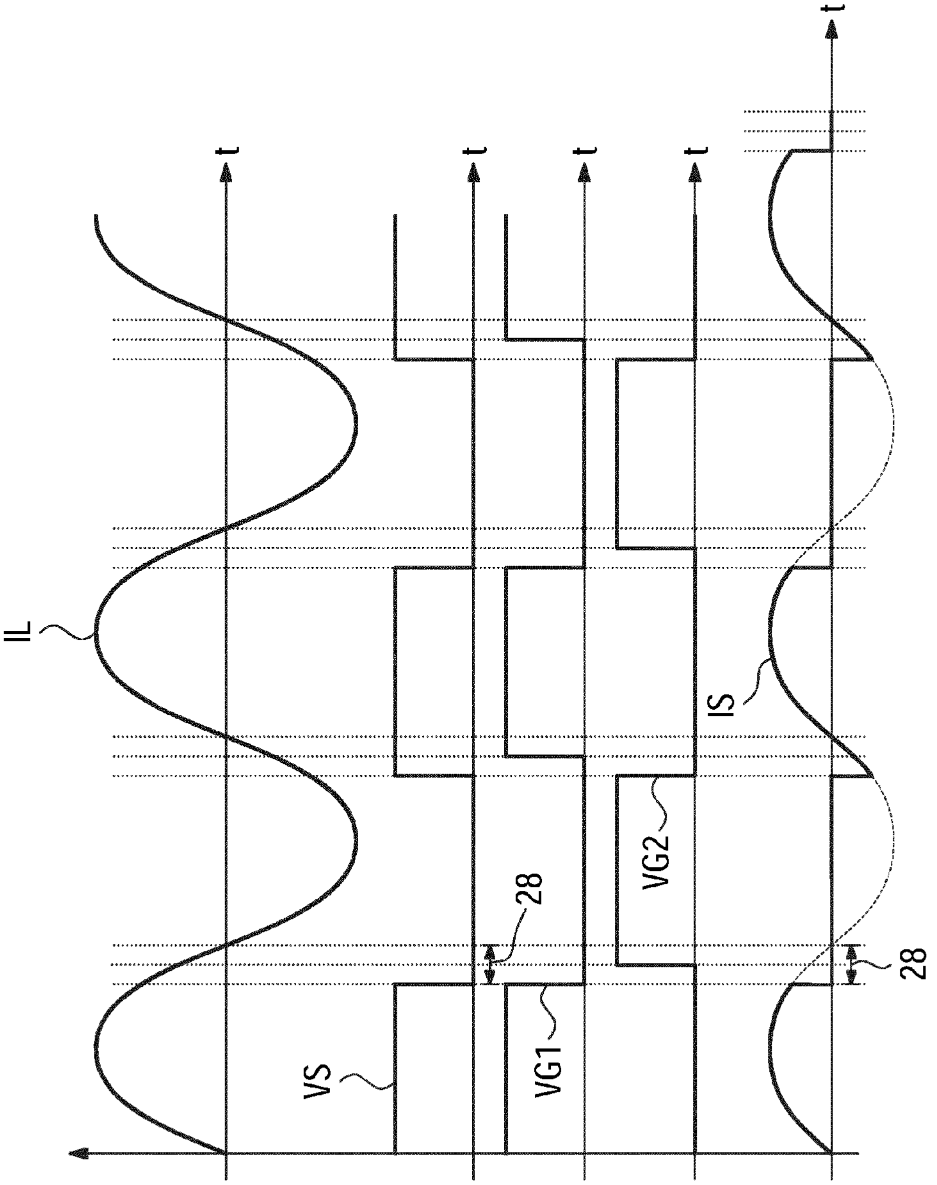
Figure 3:
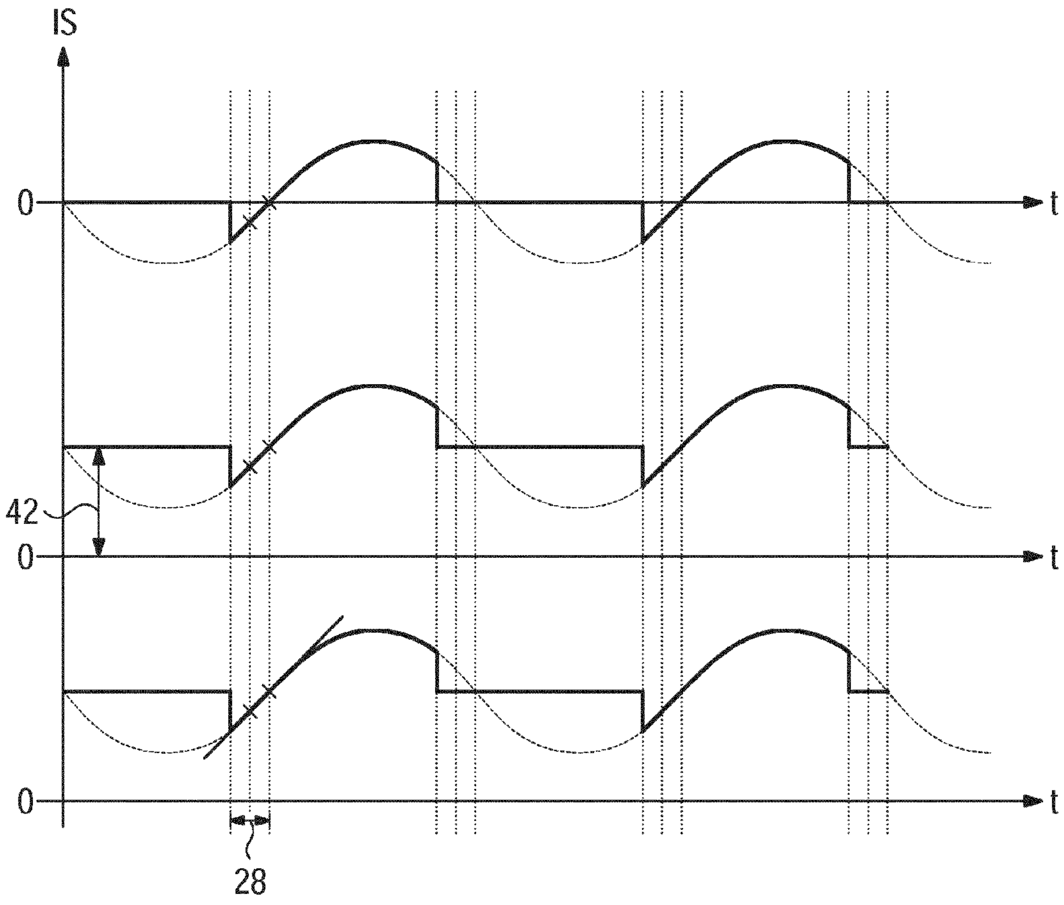
Figure 4:
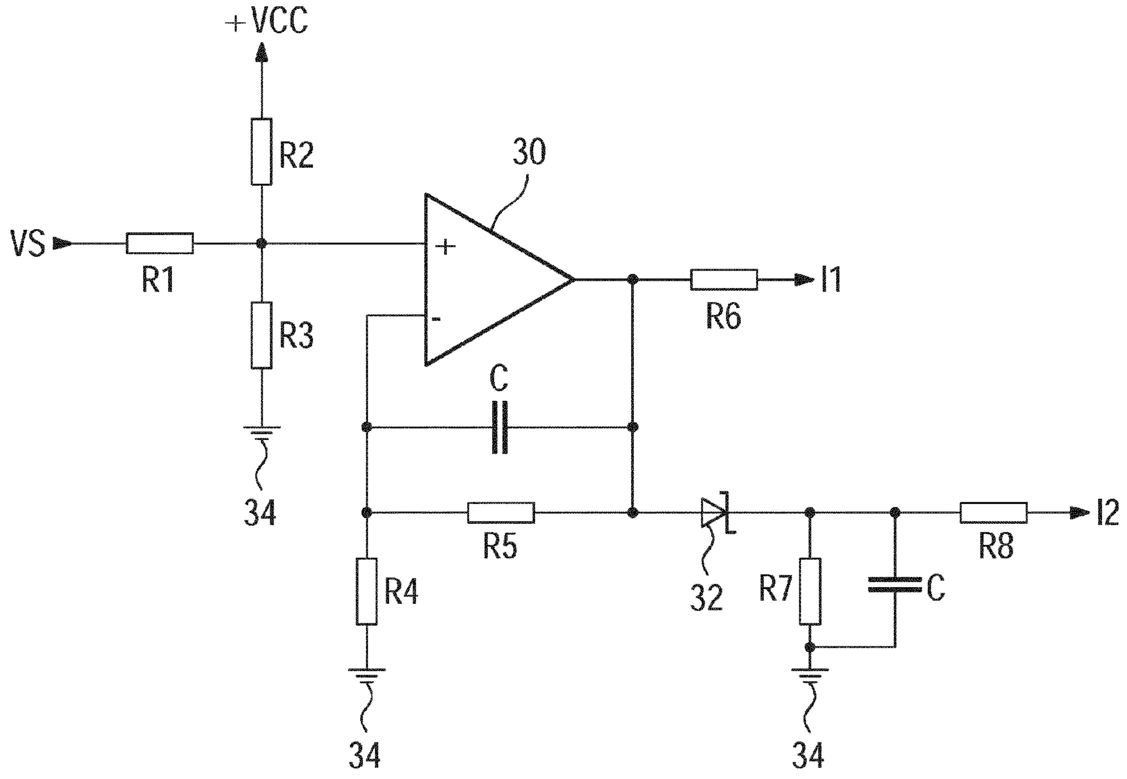
Figure 5:
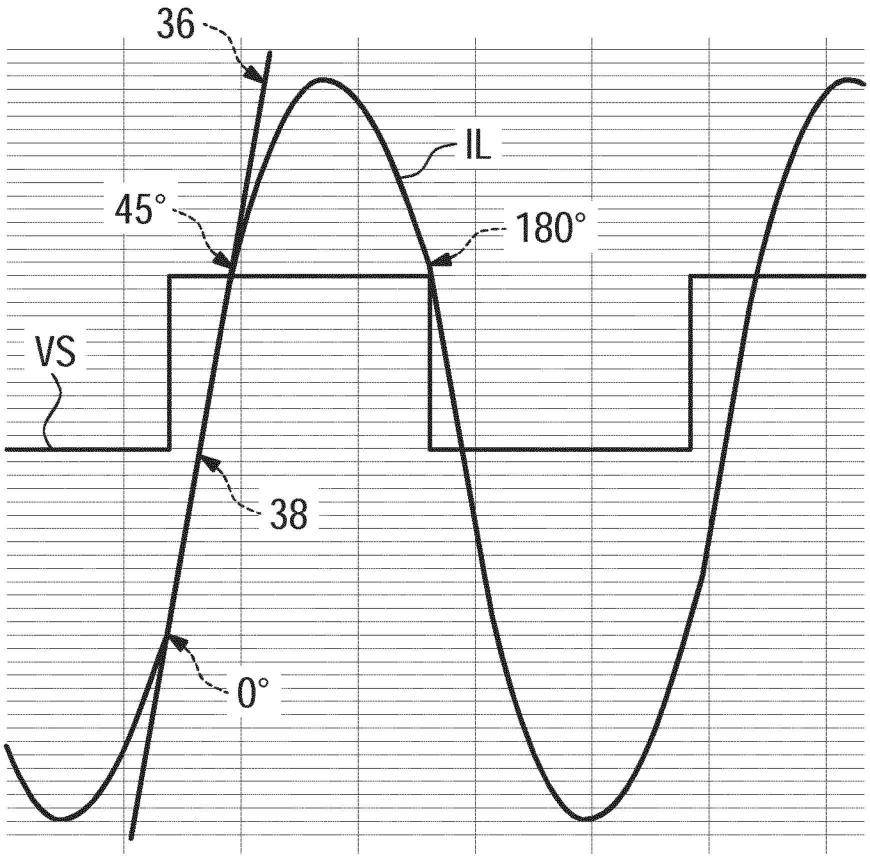
Figure 6:
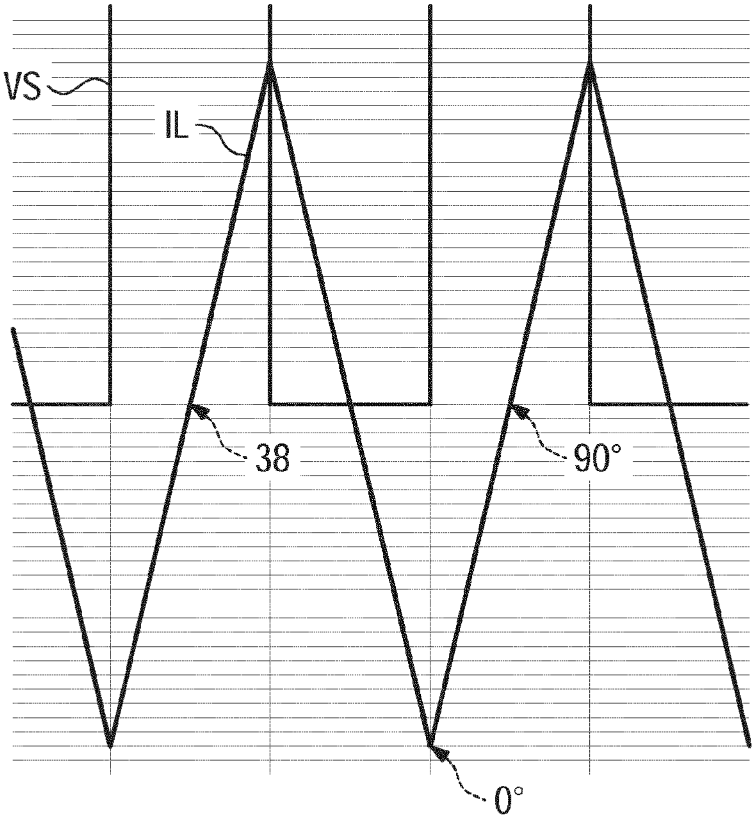
Figure 7:
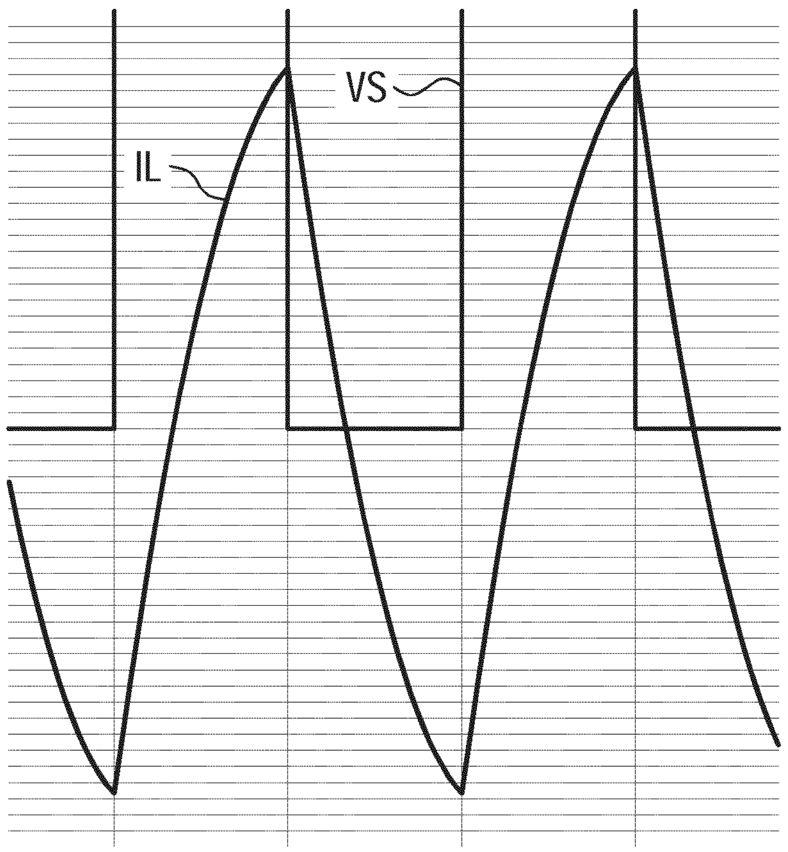
FIG. 7 illustrates a diagram of the induction coil current IL and the inverter output voltage VS of the induction heating generator according to the preferred embodiment of the present invention. The power is low in this state.
Figure 8:
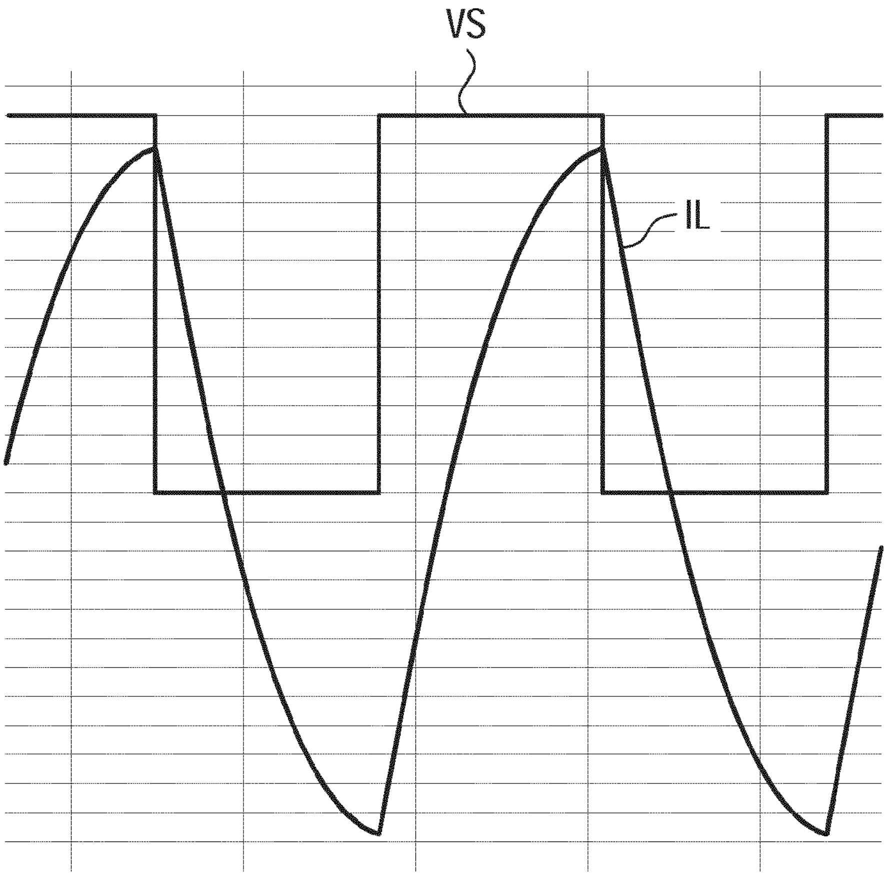
FIG. 8 illustrates a diagram of the induction coil current IL and the inverter output voltage VS of the induction heating generator according to the preferred embodiment of the present invention. A medium low power occurs in this state.
Figure 9:
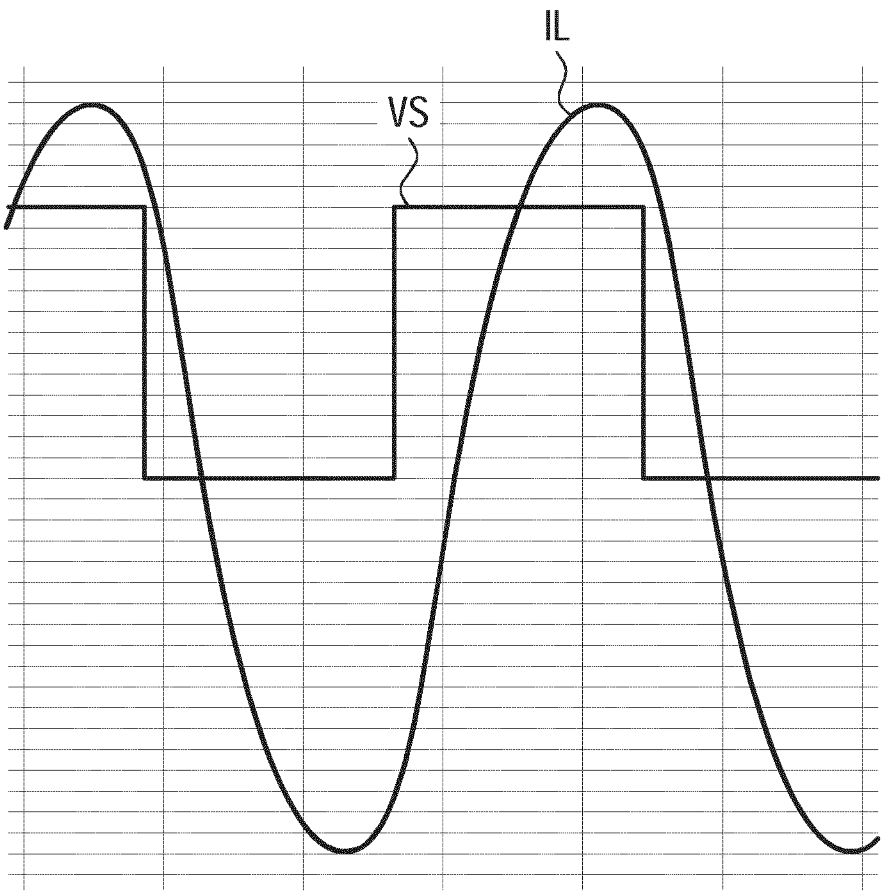
FIG. 9 illustrates a diagram of the induction coil current IL and the inverter output voltage VS of the induction heating generator according to the preferred embodiment of the present invention. The power in this state is medium high.
Figure 10:
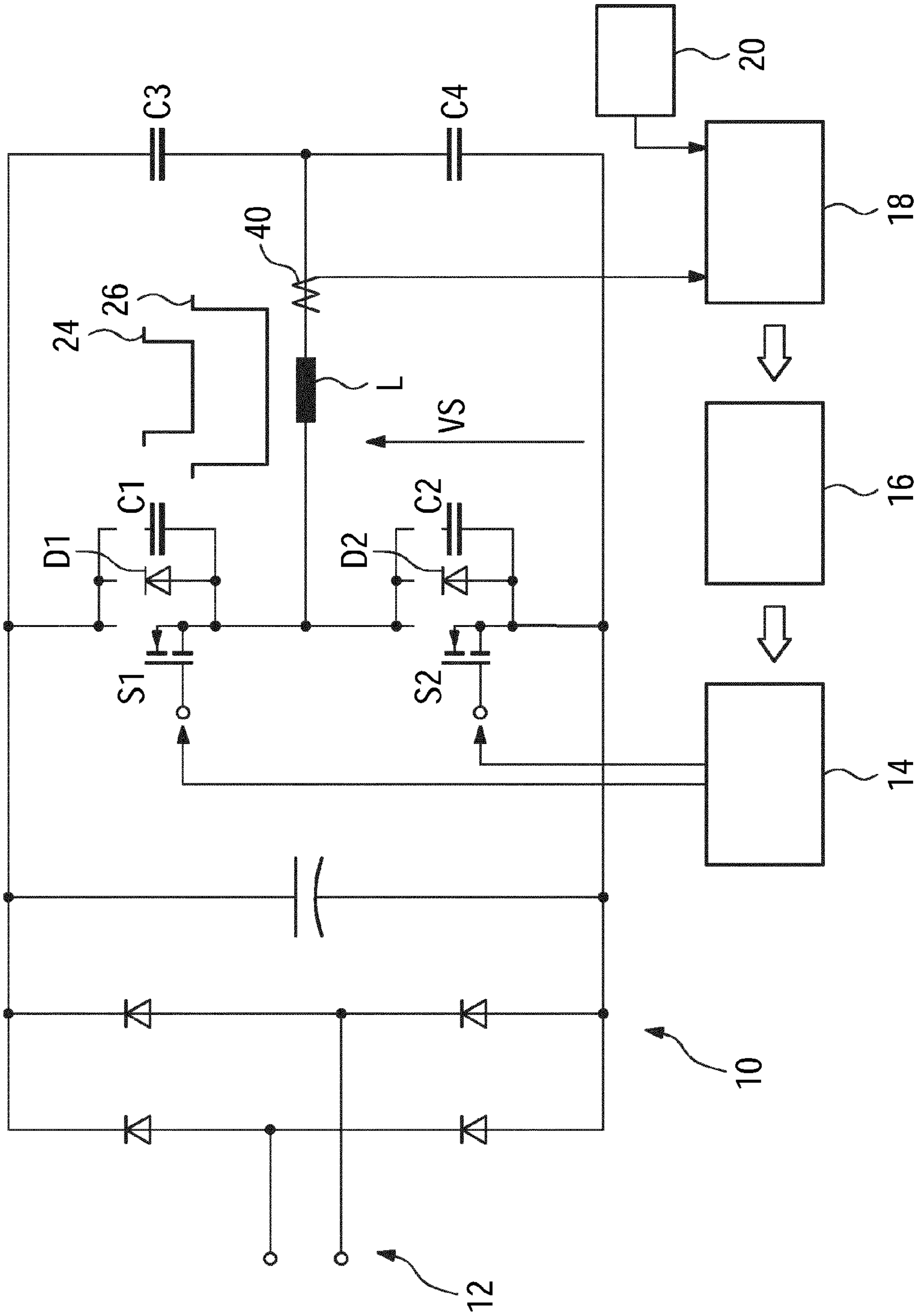

FIG. 10 illustrates a zero volt switching half bridge induction heating generator with a control circuit block according to the prior art. Said half bridge induction heating generator comprises the transistors S1 and S2, the diodes D1 and D2, the induction coil L and the capacitors C1, C2, C3 and C4. The rectifier circuit 10 includes also the four diodes and the further capacitor. The rectifier circuit 10 is provided for the connection to the AC power terminal 12. Further, the induction heating generator comprises the gate drive circuit 14, the microcontroller 16, the power control circuit 18, the zero cross detector 20 and a high frequency current transformer 40.

Figure 11:
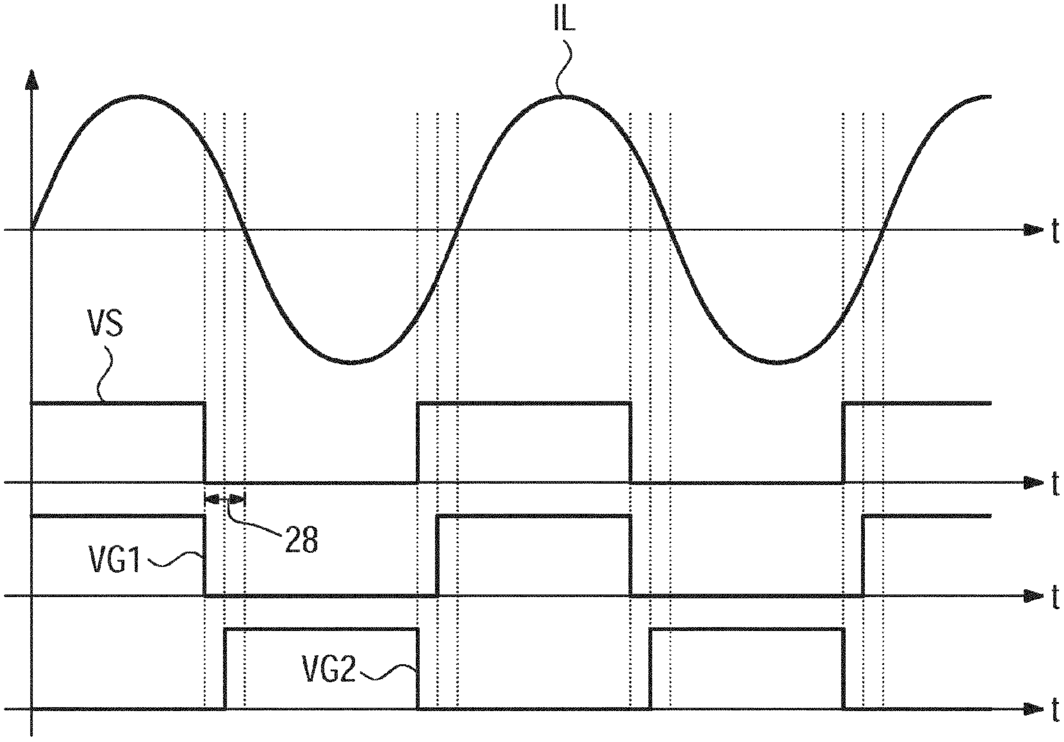

FIG. 11 illustrates a diagram of the induction coil current IL, the inverter output voltage VS and the gate voltages VG1 and VG2 of the induction heating generator according to the prior art.

Although an illustrative embodiment of the present invention has been described herein, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 rectifier circuit
12 AC power terminal
14 gate drive circuit
16 microcontroller
18 power control circuit
20 zero cross detector
22 detection circuit
24 small load
26 big load
28 phase angle delay
30 operational amplifier
32 diode
34 ground
36 intersection line
38 zero crossing
40 high frequency current transformer
42 offset voltage
S1 first transistor
S2 second transistor
D1 first diode
D2 second diode
C1 first capacitor
C2 second capacitor
C3 third capacitor
C4 fourth capacitor
L induction coil
SE shunt element
C capacitor
R1 resistor element
R2 resistor element
R3 resistor element
R4 resistor element
R5 resistor element
R6 resistor element
R7 resistor element
R8 resistor element
IL induction coil current
VS inverter output voltage
VG1 first gate voltage
VG2 second gate voltage
IS shunt current
I1 first output signal
I2 second output signal

The invention claimed is:

1. An induction heating generator, comprising:

a rectifier circuit (10), with an input of the rectifier circuit (10) being connected or connectable to an AC power terminal (12), four capacitors (C1, C2, C3, C4) forming a bridge circuit between two output terminals of the rectifier circuit (10), wherein the bridge circuit includes a first capacitor series (C1, C2) and a second capacitor series (C3, C4), an induction coil (L) interconnected in the center of the bridge circuit, at least two semiconductor switches (S1, S2) connected in each case parallel to one of the capacitors (C1, C2) of at least the first capacitor series (C1, C2), a control circuit block (14, 16, 18, 20, 22) for controlling the control electrodes of the semiconductor switches (S1, S2), and a shunt element (SE) connected in series with the first capacitor series (C1, C2), wherein:

the shunt element (SE) and the first capacitor series (C1, C2) are interconnected between the output terminals of the rectifier circuit (10), the shunt element (SE) is connected to an input of the control circuit block (14, 16, 18, 20, 22), the control circuit block (14, 16, 18, 20, 22) is provided for estimating a phase angle delay (28) between switching one semiconductor switch (S1, S2) and the subsequent zero crossing of an induction coil current (IL), and the phase angle delay (28) is estimated on the basis of an intersection line (36) of the induction coil current (IL) with a zero value.

2. The induction heating generator according to claim 1, characterized in that the induction heating generator is a half bridge induction heating generator.

3. The induction heating generator according to claim 1, characterized in that at least two diodes (D1, D2) are connected in each case parallel to one of the semiconductor switches (S1, S2).

4. The induction heating generator according to claim 1, characterized in that the control circuit block (14, 16, 18, 20, 22) comprises a detection circuit (22) for detecting a voltage drop (VS) of the shunt element (SE).

5. The induction heating generator according to claim 1, characterized in that the control circuit block (14, 16, 18, 20, 22) comprises a microcontroller (16) and an analogue digital converter.

6. The induction heating generator according to claim 1, characterized in that the components of the induction heating generator are arranged on one printed circuit board.

7. The induction heating generator according to claim 1, characterized in that the components of the induction heating generator are surface mounted devices (SMD).

8. The induction heating generator according to claim 1, characterized in that the shunt element (SE) has a resistance between 0.01Ω and 0.1Ω, in particular 0.05 Ω.

9. The induction heating generator according to claim 1, characterized in that the control circuit block (14, 16, 18, 20, 22) is provided for estimating the presence of a pot (24, 26) above the induction coil (L) on the basis of the phase angle delay (28).

10. The induction heating generator according to claim 1, characterized in that the control circuit block (14, 16, 18, 20, 22) is provided for estimating a dissipated power in the pot (24, 26) above the induction coil (L) on the basis of the phase angle delay (28).

11. The induction heating generator according to claim 1, characterized in that the intersection line (36) is estimated on the basis of at least two sample points of the induction coil current (IL).

12. The induction heating generator according to claim 1, characterized in that the semiconductor switches (S1, S2) are transistors, in particular insulated gate bipolar transistors (IGBT).

13. An induction cooking hob, characterized in that the induction cooking hob includes at least one induction heating generator according to claim 1.

* * * * *